No. 834,082. PATENTED OCT. 23, 1906.
C. P. SMITH.
POWER TRANSMISSION MECHANISM.
APPLICATION FILED MAR. 5, 1906.

WITNESSES:

INVENTOR
Charles P. Smith
By E. Laass
his ATTORNEY.

No. 834,082. PATENTED OCT. 23, 1906.
C. P. SMITH.
POWER TRANSMISSION MECHANISM.
APPLICATION FILED MAR. 5, 1906.

WITNESSES:

INVENTOR
Charles P. Smith
By E. Laass
his ATTORNEY.

UNITED STATES PATENT OFFICE.

CHARLES P. SMITH, OF ROCHESTER, NEW YORK.

POWER-TRANSMISSION MECHANISM.

No. 834,082.　　　　Specification of Letters Patent.　　　　Patented Oct. 23, 1906.

Application filed March 5, 1906. Serial No. 304,186.

*To all whom it may concern:*

Be it known that I, CHARLES P. SMITH, of Rochester, in the county of Monroe, in the State of New York, have invented new and useful Improvements in Power-Transmission Mechanism, of which the following, taken in connection with the accompanying drawings, is a full, clear, and exact description.

This invention relates to the class of mechanisms employed in the propulsion of motor-vehicles for transmitting the power from the motor or engine to the rear axle of the vehicle and which comprise a system of gearing adapted to be manually controlled, whereby the speed of the vehicle may be increased or decreased, as may be desired, and whereby the rotation of the driven shaft or axle may be reversed when required.

The main object of the present invention is to provide a power-transmitting mechanism which shall be simple, strong, and durable in construction and efficient and reliable in its operation and at the same time can be easily and readily controlled.

To that end the invention consists in the novel arrangement and combination of the component parts of the transmitting mechanism hereinafter fully described, and set forth in the claims.

In the accompanying drawings.

Referring to the drawings, 1 denotes the power-shaft, which is composed of the usual sections 2 2 3, united by pivotal coupling 4 4, which have a sliding engagement with the sections to render the shaft flexible and extensible to compensate for vertical and lateral vibrations of the transmission devices caused by travel of the vehicle over rough and uneven ground and also serving to permit the shifting of parts hereinafter described.

5 denotes the driven shaft or axle of the vehicle and which is composed of two sections, as usual, said sections being connected by the well-known differential gears supported in a box or casing 6. Inasmuch as these differential gears are common to all power-driven vehicles, a description and an illustration of the same are unnecessary.

7 denotes an annular casing which is disposed at the rear end of the power-shaft 1 and remote therefrom and axially in line therewith. This casing is provided at its rear end with a suitable flange or flanges, bolted or otherwise detachably fastened to a casing 8, as indicated at 9, through which latter casing passes the driven shaft 5.

Figure 1:
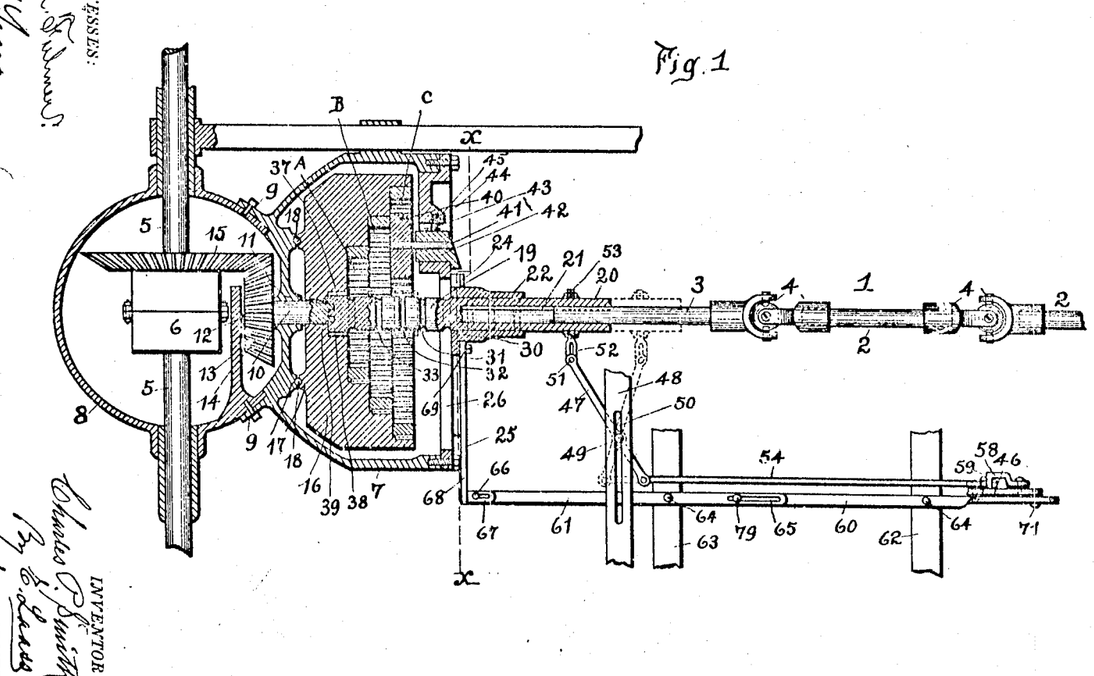
Figure 1 is partly a plan view and partly a longitudinal sectional view of the power-transmitting mechanism embodying my invention and showing the driving-shaft in direct engagement with the transmission-shaft for imparting maximum speed to the driven shaft or axle.
Figure 6:
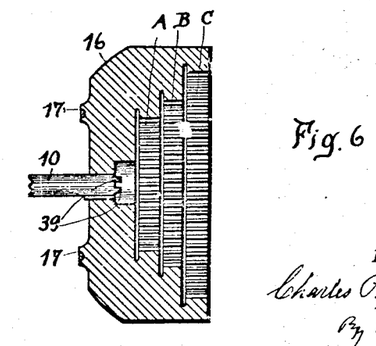
Fig. 6 is a longitudinal section of a modification of the multiple-speed wheel, wherein the internal gears are formed integral with said wheel.

10 denotes the transmission-shaft, which is journaled in a bearing 11, formed in the rear end of the casing 7. The rear end of this shaft 10 extends into the casing 8 and is provided with a suitable bearing 12 on a support 13, projecting from one of the walls of the casing, and to said end of the shaft is secured a bevel-gear 14, engaging a like gear 15, secured to one of the sections of the driven shaft 5. To the said transmission-shaft 10, within the casing 7, is secured a wheel 16, which I term a "multiple-speed wheel." This wheel is formed in its front side with a cavity provided with a series of concentric internal gears A B C, disposed side by side and having successively increasing diameters. These gears A B C may be composed of separate internally-toothed rings seated on steps formed in the cavity of the wheel and keyed or otherwise fastened thereto, as shown in Fig. 1 of the drawings, or they may be constructed by forming the teeth in the steps of the cavity, as shown in Fig. 6 of the drawings.

Between the rear wall of the casing 7 and the wheel 16 are provided corresponding bearing-rings 17 17, secured to said parts, and between said rings are interposed the well-known antifriction-balls 18 18, whereby the said wheel is afforded a free and steady rotation.

19 denotes a longitudinally-disposed driving-shaft which is adapted to be shifted longitudinally and laterally, as will be shortly described. Said driving-shaft is formed with a hollow forward end portion or sleeve 20, telescoping the rear end section 3 of the flexible power-shaft 1. This sleeve portion 20 of the driving-shaft is adapted to slide longitudinally on the shaft-section 3 and is caused to rotate therewith by means of the well-known spline-and-groove connection, as indicated at 21. Said driving-shaft is supported in a journal-box 22, which is formed with flanges 23 23, by which it is mounted laterally shiftable in a pair of guides 24 24, secured to or formed integral with the outer face of the removable front plate 25 of the casing 7. Said guides extend along the top and bottom edges of a horizontal slot 26 in the front plate 25, the top edge of which slot is provided with a series of recesses 27 27 27, disposed at one side of the center of the plate and corresponding in number to the aforesaid internal gears A B C. At the center of the plate the slot is provided with a similar recess 28 (shown in Fig. 5) and at the opposite side of the center thereof the said slot is provided with another recess 29, the purpose of which recesses will be shortly explained.

Figure 5:
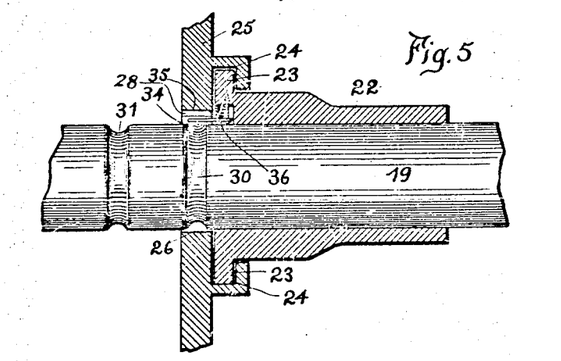
Fig. 5 is an enlarged detail longitudinal section of the laterally-shiftable journal-box which supports the driving-shaft on the inclosing case of the internal gears and showing the means for regulating the longitudinal movement of said driving-shaft.

The driving-shaft 19 extends through the slot 26 to permit the same to be shifted laterally, and it is provided with a series of circumferential grooves 30 31 32 33, uniformly spaced apart and adapted to be engaged by a dog 34, which is fastened in a socket or recess 35, formed in the inner end of the aforesaid journal-box 22 and disposed above the driving-shaft, in which socket is provided a suitable spring 36, serving to press the dog downward, so as to bear upon the shaft, as more clearly shown in Fig. 5 of the drawings.

On the outer end of the driving-shaft 19 is secured a pinion 37, adapted to engage any one of the internal gears A B C, which engagement is effected by a forwardly, laterally, and rearwardly shifting movement of the driving-shaft, as will be hereinafter fully explained. The outer end of the said driving-shaft is adapted to abut against the inner end of the transmission-shaft 10 when the former is shifted rearwardly to its full extent, as shown in Fig. 1 of the drawings, and when in this position it is interlocked with the transmission-shaft, whereby a direct drive is imparted to said transmission-shaft, and thus maximum speed is transmitted to the driven shaft 5.

The means for interlocking the shafts 10 and 19 may be of any suitable form. However, I prefer to employ the means shown, which consists of a plurality of sockets 38 38, formed in the end of the shaft 19, or more properly, the side of the pinion, which sockets are adapted to be engaged by studs 39 39, projecting from the end of the shaft 10. When the shaft 19 is disposed to impart direct drive to the shaft 10, it will be seen that the axes of the said shafts are in line with the axis of the power-shaft 1, as illustrated in Fig. 1 of the drawings.

40 denotes a reversing-gear which is journaled on a short shaft 41, disposed parallel with the driving-shaft and secured to a block 42, supported laterally shiftable in a slot 43 in the plate 25 of the casing 7, which gear is adapted to be engaged by the pinion 37 and is also adapted to engage the largest or "low-speed" internal gear C. This slot 43 is disposed in line with the aforesaid slot 26 and at the outer end thereof is provided a socket 44, in which is seated a spiral spring 45, serving to force the block 42 toward the driving-shaft so as to retain the said reversing-gear normally out of engagement with the said internal gear C.

Figures 3, 7:
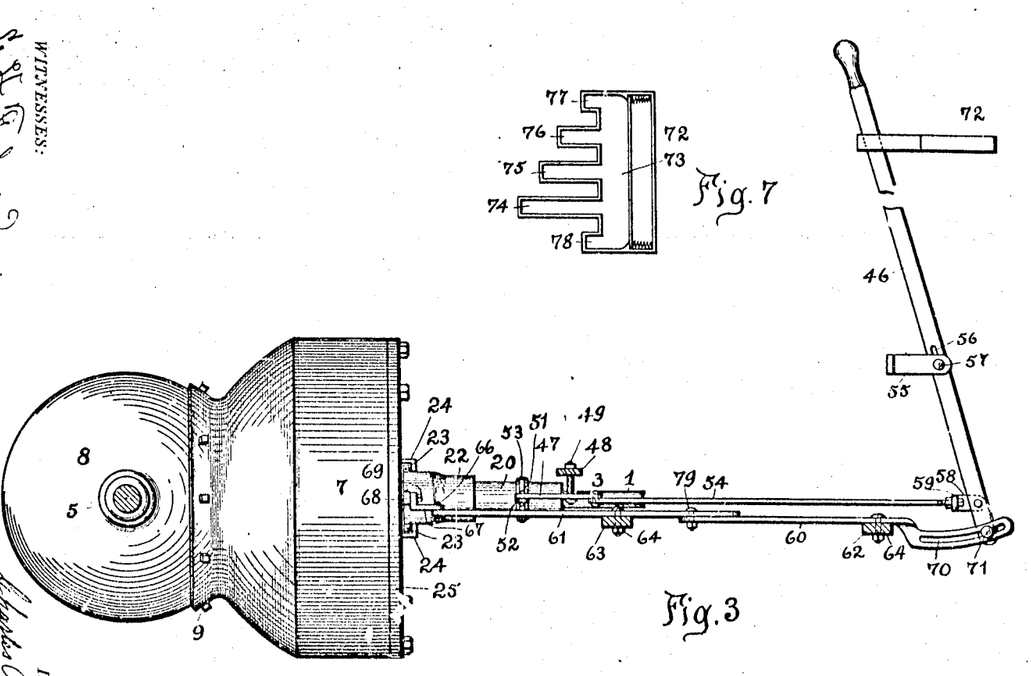
Fig. 3 is a side view showing more clearly the manually-operated devices for shifting the driving-shaft longitudinally and laterally.
Fig. 7 is a detail plan view of the device for receiving the upper portion of the hand-lever which is employed for actuating the shifting mechanism and serving to retain the lever in laterally-moved position.
Figure 4:
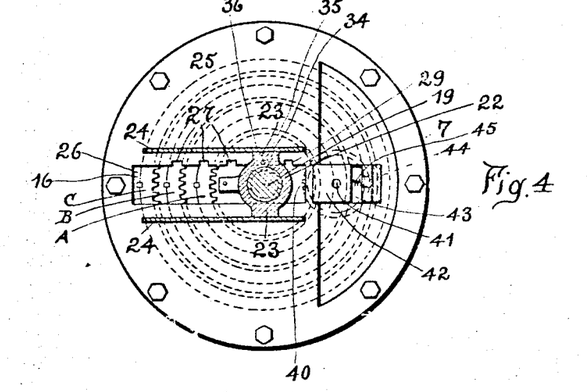
Fig. 4 is a transverse section on the dotted line X X in Fig. 1 and showing the means for regulating the lateral movement of the driving-shaft and locking the pinion in its engagement with the internal gears.

Separate mechanisms are employed for shifting the driving-shaft longitudinally and laterally, and I prefer to actuate both mechanisms by a single hand-lever (represented at 46.) These shifting mechanisms may be of any suitable construction. However, I prefer to employ the forms herewith shown, and therefore I will now proceed to describe the same. In reference to the devices for imparting longitudinal movement to said driving-shaft, 47 represents a lever which is pivoted to a transverse bar 48, as indicated at 49, which bar may be supported on the usual running-gear or frame upon which the vehicle-body is mounted. The pivot-pin 49 of said lever engages a longitudinal slot 50 in the bar, or the lever may be otherwise attached to bar, so as to permit the driving-shaft to be shifted laterally. One end of the lever 47 is provided with a pin 51, which engages a horizontally-slotted arm 52, projecting from a collar or ring 53, loosely embracing the sleeve portion 20 of the driving-shaft, and the opposite end of said lever is pivotally connected to the rear end of a longitudinally-disposed rod 54, the forward end of which rod is pivotally connected to the lower end of the aforesaid hand-lever 46. This lever is preferably pivoted to a suitable bracket 55, which may be fastened to any part of the vehicle, whereby the said lever can be conveniently operated by a person seated in the vehicle. This hand-lever is provided with a longitudinal slot 56, by which it engages the pivot-pin 57 on the bracket 55, so as to permit the said lever to be moved sidewise, as well as forwardly and rearwardly, in order to effect the lateral shifting of the driving-shaft, as will be presently described. In the attachment of the aforesaid rod 54 to the hand-lever I prefer to employ a link 58, provided with an ear 59, to which the rod is pivoted, which link is in turn pivoted to the lever, as shown in Fig. 3 of the drawings. This arrangement or other loose connection of the rod and lever is necessary in order to allow the lever to be freely moved sidewise. When the hand-lever 46 is thrown to its extreme rearward position, the rear end of the driving-shaft 19 is caused to abut against the forward end of the aforesaid transmission-shaft 10 and to be interlocked therewith, and thus a direct drive is imparted to the latter shaft, which in turn transmits motion to the driven shaft through the usual bevel-gears 14 15 wherein maximum speed is attained. It will be noted that when the driving-shaft is in direct engagement with the transmission-shaft 10 the aforesaid dog 34 engages the circumferential groove 30 of the said driving-shaft, whereby the latter shaft is prevented from accidentally moving forward, which would result in its becoming disengaged from the shaft 10. The lateral movement of the driving-shaft 19 is effected by the shifting of its journal-box 22, which slides in the guides 24 24 on the front plate of the casing 7, as hereinbefore stated. The mechanism which I prefer to employ for imparting lateral movement to said shaft will now be described.

60 61 denote a pair of levers which are pivoted intermediate their ends, respectively, to transverse bars 62 63, as indicated at 64 64, which bars may be supported in any suitable and convenient manner. These levers are disposed in line with each other when the shaft 19 is in direct driving position, as shown in Fig. 1 of the drawings, and the rear end of the lever 60 is provided with a pin or bolt 79, engaging a longitudinal slot 65 at the forward end of the lever 61. The rear end of the latter lever is provided with a pin 66, pivotally engaging a slotted ear 67, projecting from the outer end of an arm 68, which extends at right angles from the journal-box 22 and is rigidly fastened thereto, as indicated at 69. The forward end of the lever 60 is connected to the hand-lever 46 at a point below the attachment of the aforesaid rod 54.

In order to allow the hand-lever to be moved forward and rearward to actuate the longitudinal shifting mechanism hereinbefore described independent of the latter shifting mechanism, I provide the forward end of the lever 60 with a segmental slot 70, which is engaged by a pin 71, secured to the lower end of the hand-lever, as shown more clearly in Fig. 3 of the drawings.

Figure 2:
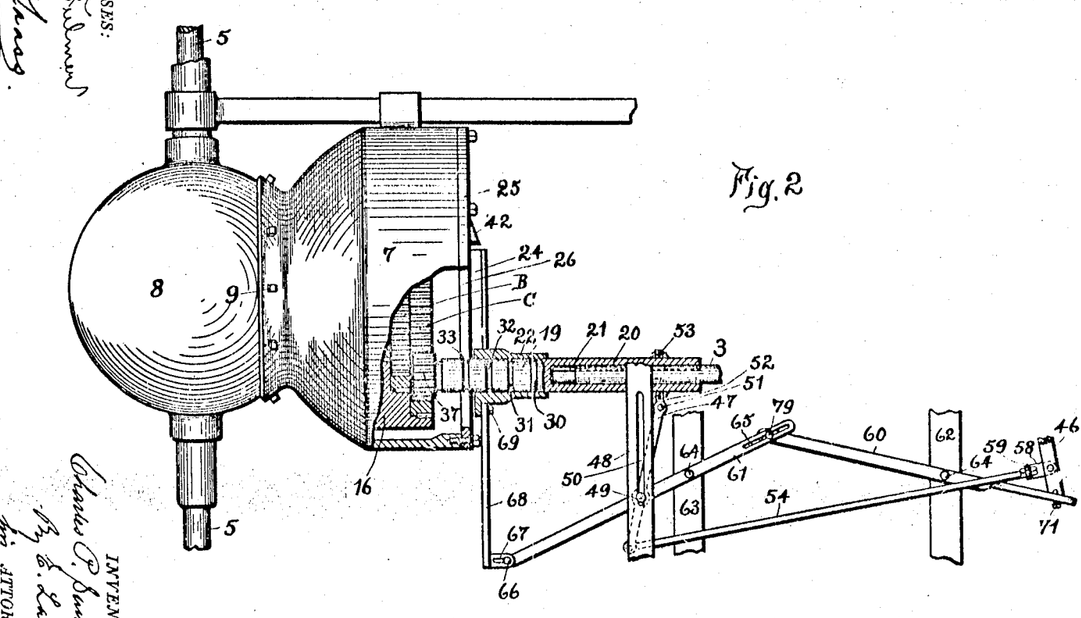
Fig. 2 is also partly a plan vew and partly a longitudinal section and showing the driving-shaft shifted forwardly and laterally to carry its pinion into engagement with the largest internal gear for imparting minimum speed to the driven shaft.

The operation of the described transmitting mechanism is as follows: Assuming the driving-shaft 19 to be in engagement with the shaft 10, it is obvious that the power will be transmitted directly from the shaft 1 to the driven shaft or axle 5, whereby maximum speed is attained, as hereinbefore stated. At this time the hand-lever 46 and the shifting mechanisms are in the positions shown in Figs. 1 and 3 of the drawings and the aforesaid dog 34 is in engagement with the circumferential groove 30 of the driving-shaft. In order to disengage the driving-shaft from the transmission-shaft 10, the person in charge throws the hand-lever forward, whereby the rod 54 is caused to actuate the lever 47, which shifts the said driving-shaft forward, as indicated by dotted lines in Fig. 1. It will be understood that the shaft 1 is connected to the engine or motor shaft by means of suitable clutch devices which may be controlled by the person in charge for throwing the shaft 1 into and out of operative engagement. Said clutch devices are not shown, as they are common to all transmission mechanisms. To start the vehicle, it is obvious that a low-speed connection should be used between the driving-shaft and driven shaft. Therefore in this instance the driving-shaft is shifted forwardly by the hand-lever, so as to carry the pinion 37 beyond the range of the largest internal gear C. Then by moving the hand-lever 46 to the left the levers 60 61 are actuated, whereby the journal-box 22 is shifted laterally to the position shown in Fig. 2 of the drawings. It will be understood that this movement is permitted by the flexibility of the power-shaft 1. It is obvious that by thus shifting the journal-box 22 the driving-shaft is moved correspondingly. It will be further understood that previous to the lateral shifting of said shaft the spring-pressed dog 34 is forced out of the circumferential groove 30 of the shaft by the forward movement thereof, during which movement the spring 36 allows the dog to yield to prevent its becoming locked with the succeeding grooves 31 32, and when the pinion has reached a position slightly beyond the range of the internal gear C the said dog is caused to engage the outermost groove 33 of the shaft. By this arrangement of the grooves in relation to the dog the longitudinal movement of the driving-shaft is positively regulated. When the journal-box 22 has been shifted laterally, as hereinbefore stated, the dog 34, carried thereon, is caused to register with the outermost recess 27 in the top edge of the slot 26; but it is still pressed into engagement with the circumferential groove 33 of the driving-shaft by the spring 36. The pinion at this time is maintained beyond the range of said internal gear C, but in position to be moved into mesh with said gear. This engagement of the pinion and gear is then effected by throwing the hand-lever 46 rearward, whereby the rod 54 and lever 47 are actuated to shift the driving-shaft rearward, as shown in Fig. 2 of the drawings. This latter movement of the driving-shaft forces the dog 34 upward out of the circumferential groove 33 of the shaft, whereby the dog is caused to enter the outermost recess 27 of the slot 26. The engagement of the dog with this recess securely locks the journal-box 22 in its laterally-shifted position to retain the pinion in engagement with the said internal gear C. When the pinion is thus engaged, it is obvious that the person in charge will actuate the usual clutch devices referred to for the purpose of throwing the power-shaft 1 into operative connection with the engine or motor. It is well known to persons familiar with automobile constructions that such clutch devices are controlled by a suitable lever conveniently arranged to be operated by the hand or foot of the person seated in the vehicle.

72 represents a device which may be supported on the vehicle in any convenient manner and is designed to be placed at one end of the operator's seat or otherwise arranged to be engaged by the upper portion of the hand-lever 46. This device consists of a frame provided with a passage 73, which is designed to extend longitudinally in relation to the vehicle-seat, in which passage the lever moves during its lateral shifting movement, and communicating with said passage is a series of rearwardly-extending slots 74 75 76 77, which the said lever is adapted to enter when it is thrown rearward in the operation of shifting the driving-shaft 19 correspondingly. The engagement of the lever with a slot serves to prevent the driving-shaft from accidentally shifting forward incident to jar and vibration to which the parts are subjected when the vehicle is under motion, and the resultant throwing the pinion out of engagement with the internal gear.

It will be seen that when the driving-shaft has been shifted to its rearmost position to directly engage the transmission-shaft 10, as hereinbefore described, the hand-lever 46 is in the longest slot 74 of the frame 72, as shown in Fig. 3 of the drawings, and it will be understood that the said lever will engage the slot 77 when the driving-shaft has been shifted laterally and rearwardly to carry its pinion into engagement with the largest or low-speed internal gear C. It will be apparent that in case it is desired to increase the speed of the vehicle the hand-lever 46 is moved forward to shift the driving-shaft correspondingly, whereby the pinion disengages the said internal gear C, and at the same time the dog 34 is caused to enter the circumferential groove 33 of the shaft. This engagement of the dog with the groove and its resultant disengagement from the recess 27 allows the journal-box 22 and driving-shaft to be shifted laterally in reverse direction a sufficient distance to cause the dog to register with either of the other recesses 27 27, which correspond to the respective internal gears A and B, which movement is regulated by the hand-lever 46 in its movement to the left. When the shaft has been thus shifted, the hand-lever is again thrown backward, whereby the dog is forced upward out of engagement with the groove 33 and caused to engage either of the other recesses 27 27, according to the internal gear which is to be engaged by the pinion 37, and thus the journal-box carrying the shaft is locked to the front plate of the casing, as before stated.

It is obvious that when the pinion is in engagement with the internal gear B the hand-lever will be in the slot 75 of the frame 72, and when the pinion is in engagement with the other internal gear A the said lever will be in the slot 76 for the purpose hereinbefore described. It will be further understood that in case the driving-shaft is in direct engagement with the transmission-shaft 10, as before described, and shown in Fig. 1, and it is desired to effect a reduced speed the clutch devices (not shown) are operated in the usual manner to throw the power-shaft 1 out of operative connection with the engine or motor. Then the hand-lever is operated to shift the driving-shaft 19 forwardly sufficiently to carry the pinion beyond the range of the internal gear A or the internal gear B, as before, in which instance the corresponding circumferential grooves 31 32 are caused to be engaged by the aforesaid dog 34 to regulate the movement of the shaft. Then the shaft is shifted laterally and rearwardly in the manner aforesaid to cause the pinion to engage the internal gear It will thus be apparent that four speeds may be transmitted to the driven shaft or axle. It should be stated that following the engagement of the pinion with the internal gear the clutch devices are to be operated to throw the shaft into operative connection with the shaft 1.

When it is desired to propel the vehicle rearwardly, the hand-lever 46 is thrown forwardly, whereby the driving-shaft is shifted correspondingly to carry the pinion in range with the reversing-gear 40, which faces the largest or low-speed internal gear C and is normally out of mesh. Then the hand-lever is thrown to the right to shift the shaft laterally in the direction indicated by the arrow in Fig. 1, whereby the pinion 37 engages the reversing-gear 40, and by a further movement of the said lever the reversing-gear is shifted laterally with the pinion and caused to engage the aforesaid internal gear C. By this arrangement of the parts it is obvious that a rearward rotation will be transmitted from the driving-shaft to the driven shaft or axle 5. It will be understood that when the parts are in the positions just described the hand-lever may be moved slightly rearward so as to engage the slot 78 of the frame. By this rearward movement the aforesaid dog 34 is caused to engage the recess 29 of the slot 26. By shifting the driving-shaft to carry the pinion out of engagement with the reversing-gear the latter is automatically moved to its normal position by the spring 45, which forces the supporting-block 42 of said reversing-gear toward the driving-shaft, said block being adapted to slide in a slot 43 in the front plate of the casing 7, as hereinbefore described, and clearly illustrated in Fig. 1 of the drawings. It will be understood that to facilitate the entrance of the teeth of the pinion between the teeth of the internal gears I chamfer the side edges of said teeth in the well-known manner.

What I claim is—

1. In a mechanism of the character described, the combination with a power-shaft, of a longitudinally and laterally shiftable driving-shaft, a driven shaft arranged transversely in relation to the driving-shaft, a series of united gears of different diameters arranged side by side, a transmission-shaft adapted to be driven by each of said gears and permanently connected to the driven shaft, a pinion secured to the driving-shaft and adapted to be shifted thereby from one gear to another for changing the speed of the driven shaft, and separate and independently-operated devices for imparting longitudinal and lateral movements to the said driving-shaft as set forth.

2. In a mechanism of the character described, the combination with a power-shaft, of a longitudinally and laterally shiftable driving-shaft, a driven shaft, a series of concentrically-arranged gears of different diameters disposed side by side and united, a pinion secured to the driving-shaft and adapted to engage any one of said gears, two separate and independently-operated devices for imparting longitudinal and lateral movements to said driving-shaft, and means transmitting motion from said gears to the driven shaft as set forth.

3. In a mechanism of the character described, the combination with a power-shaft, of a longitudinally and laterally shiftable driving-shaft, a driven shaft, a series of united internal gears disposed side by side, a transmission-shaft permanently connected to said gears and driven shaft, a pinion secured to said driving-shaft and shifted thereby so as to engage any one of said internal gears, two separate devices for shifting the driving-shaft longitudinally and laterally, and a single manually-operated lever for actuating said devices independently as set forth.

4. In a mechanism of the character described, the combination with a power-shaft, of a longitudinally and laterally shiftable driving-shaft, a driven shaft disposed transversely in relation to the driving-shaft, a series of gears of different diameters united side by side, a pinion secured to the driving-shaft and adapted to engage any one of said gears by the shifting of said shaft, a laterally-shiftable reversing-gear arranged to be engaged by said pinion and shifted thereby so as to engage one of said gears, means for shifting said driving-shaft, and a shaft disposed in line with the axes of said gears and transmitting motion to the driven shaft as set forth.

5. In a mechanism of the character described, the combination with a power-shaft, of a shiftable driving-shaft, a driven shaft, disposed transversely in relation to the driving-shaft, a suitably-journaled multiple-speed wheel, means transmitting motion from said wheel to the driven shaft, a pinion rotated by and adapted to be shifted with the driving-shaft and disposed to engage the wheel, a laterally-shiftable reversing-gear adapted to be actuated by said pinion, and moved thereby into engagement with the said wheel and means for shifting said driving-shaft as set forth.

6. In a mechanism of the character described, the combination with a power-shaft, of a driving-shaft adapted to be shifted into and out of axial alinement with said power-shaft, a driven shaft, disposed transversely in relation to the driving-shaft, a suitably-journaled wheel disposed axially in line with the power-shaft and provided with a series of internal gears having different diameters, a pinion carried on the driving-shaft and thereby shifted to engage any one of said internal gears, bevel-gears transmitting motion from said wheel to the driven shaft, and means for shifting said driving-shaft as set forth.

7. In a mechanism of the character described, the combination with a power-shaft and driven shaft, of a suitably-journaled wheel disposed axially in line with the power-shaft and provided with a series of internal gears of different diameters, means transmitting motion from said wheel to the driven shaft, a driving-shaft extending into said wheel and adapted to be shifted longitudinally and laterally into and out of alinement with the power-shaft and rotated thereby, a pinion secured to the outer end of said driving-shaft and adapted to engage any one of said gears by the shifting of the shaft, means for shifting the same, a shiftable reversing-gear disposed adjacent to the largest gear of the series and held normally out of engagement therewith, said reversing-gear being adapted to be engaged by the pinion and to be shifted thereby so as to engage the aforesaid gear as set forth.

8. In a mechanism of the character described, the combination with a power-shaft and driven shaft, of a suitably-journaled wheel disposed axially in line with the power-shaft and provided with a series of internal gears of successively-increasing diameters and arranged side by side, bevel-gears transmitting motion from the wheel to the driven shaft, a driving-shaft adapted to be shifted longitudinally and laterally in relation to the power-shaft and rotated thereby, a pinion secured to said driving-shaft and moved thereby into engagement with any one of said gears, a reversing-gear shiftable laterally toward and from one of said gears and disposed to be engaged by said pinion, means for automatically shifting said reversing-gear out of engagement with the internal gear, and means for shifting the driving-shaft as set forth.

9. In a mechanism of the character described, the combination with a flexible power-shaft, of a driven shaft disposed transversely of said power-shaft, a series of united internal gears having different diameters, a shaft and bevel-gears transmitting motion from the internal gears to the driven shaft, a longitudinally and laterally shiftable driving-shaft provided at one end with a sleeve slidably connected to the power-shaft and provided at its opposite end with a pinion adapted to engage any one of said internal gears, a laterally-shiftable reversing-gear disposed to be engaged by the pinion and moved thereby into engagement with one of said internal gears, manually-operated means connected to the aforesaid sleeve for imparting shifting movement to the driving-shaft, and means automatically shifting the said reversing-gear out of engagement with the internal gear as set forth.

10. In a mechanism of the character described, the combination with a flexible power-shaft composed of pivotally-joined sections, a driven shaft, a longitudinally and laterally shiftable driving-shaft formed with a sleeve at one end sliding on the rear section of the power-shaft and locked to rotate therewith, a pinion secured to the rear end of the driving-shaft, a series of united internal gears of different diameters disposed concentrically side by side, two independently-operated devices connected to said driving-shaft for shifting the same longitudinally and laterally to move the pinion into and out of engagement with any one of said internal gears, and bevel-gears transmitting motion from said internal gears to the driven shaft as set forth.

11. In a transmission mechanism, the combination with a flexible power-shaft composed of pivotally-connected sections, and the driven shaft, of a longitudinally and laterally shiftable driving-shaft having a sliding connection with the rear section of the power-shaft and provided with a series of circumferential grooves, a pinion secured to the rear end of said driving-shaft, a series of united internal gears arranged side by side and having successively-increasing diameters, separate mechanisms for shifting the driving-shaft longitudinally and laterally whereby the pinion is carried into and out of engagement with any one of said gears, means adapted to automatically engage the aforesaid grooves to regulate the longitudinal movement of the driving-shaft, a single lever for operating said shifting mechanisms, and a shaft and bevel-gears transmitting motion from said internal gears to the driven shaft as set forth.

12. In a power-transmission mechanism, the combination with a flexible power-shaft composed of pivotally-joined sections, and the driven shaft, of a longitudinally and laterally shiftable driving-shaft having a sliding connection with the rear end section of the power-shaft, a pinion secured to the outer end of said driving-shaft, a series of united internal gears arranged side by side and having successively-increasing diameters, means for shifting the driving-shaft to carry the pinion into and out of engagement with any one of the internal gears, a reversing-gear disposed adjacent to the largest internal gear, and adapted to be engaged by the pinion and shifted laterally therewith so as to engage said internal gear, spring-actuated means automatically shifting said reversing-gear out of engagement with the said internal gear, and means transmitting motion from said internal gears to the driven shaft as set forth.

13. In a power-transmission mechanism, the combination with a flexible power-shaft, and the driven shaft, of a shiftable driving-shaft having a sliding connection with the power-shaft and provided at its outer end with a pinion, a wheel provided with a series of internal gears having different diameters, separate mechanisms for shifting the driving-shaft longitudinally and laterally to carry its pinion into and out of engagement with any one of the internal gears, a reversing-gear arranged to be engaged by said pinion and adapted to be shifted laterally thereby to cause the same to engage one of the internal gears, means automatically shifting said reversing-gear to its normal position when released from the pinion, and bevel-gears transmitting motion from said wheel to the driven shaft as set forth.

14. In a power-transmission mechanism, the combination with a power-shaft and driven shaft disposed transversely in relation to said power-shaft, of a transmission-shaft disposed axially in line with said power-shaft, bevel-gears connecting said transmission-shaft with the driven shaft, a multiple-speed gear-wheel secured to the transmission-shaft, a longitudinally and laterally shiftable driving-shaft suitably connected to the power-shaft and adapted to directly engage the transmission-shaft to impart maximum speed to the driven shaft, a pinion secured to the driving-shaft, mechanism operative for shifting the latter shaft longitudinally into and out of engagement with the transmission-shaft, mechanism for shifting said driving-shaft laterally to effect the engagement of said pinion with the multiple-speed gear-wheel, and a single manually-operated lever for actuating said shifting mechanism independently as set forth.

15. In a power-transmission mechanism, the combination with the power-shaft and the driven shaft, of a transmission-shaft disposed axially in line with the power-shaft, bevel-gears connecting the transmission-shaft with the driven shaft, a multiple-speed gear-wheel mounted on said transmission-shaft, a longitudinally and laterally shiftable driving-shaft having a sliding connection with the power-shaft and adapted to directly engage the transmission-shaft to impart maximum speed to the driven shaft, a pinion carried on said driving-shaft and adapted to be moved into engagement with said gear-wheels when the latter shaft is disengaged from the transmission-shaft to impart minimum or intermediate speeds to said driven shaft, a laterally-shiftable reversing-gear adapted to engage said multiple-speed gear-wheel and to be engaged by said pinion, and means for shifting the said driving-shaft as set forth.

16. In a power-transmission mechanism, the combination with the power-shaft and the driven shaft, of a transmission-shaft disposed axially in line with the power-shaft and remote therefrom, a multiple-speed gear-wheel mounted on the transmission-shaft, means connecting the latter shaft with the driven shaft, a driving-shaft suitably connected to the power-shaft and adapted to be shifted longitudinally and laterally into and out of axial alinement with the transmission-shaft and adapted to directly engage the same to impart maximum speed to the driven shaft, a pinion secured to the driving-shaft and adapted to be moved thereby into and out of engagement with said gear-wheel, whereby the transmission-shaft is caused to impart minimum or intermediate speeds to the driven shaft, a reversing-gear normally out of engagement with said gear-wheel and adapted to be engaged by the aforesaid pinion and to be shifted laterally thereby to engage said gear-wheel, means automatically shifting the reversing-gear to its normal position, separate mechanisms for shifting the driving-shaft longitudinally and laterally, and manually-operated means for controlling said shifting mechanisms as set forth.

17. In a power-transmission mechanism, the combination with the power-shaft and driven shaft, of a transmission-shaft disposed axially in line with the power-shaft and remote from the rear end thereof, a multiple-speed gear-wheel mounted on the transmission-shaft, means connecting the latter shaft with the driven shaft, a driving-shaft having a suitably-sliding connection with the power-shaft and adapted to be shifted longitudinally and laterally into and out of axial alinement with the transmission-shaft, a pinion secured to the rear end of the driving-shaft means operative for temporarily interlocking the driving-shaft with the said transmission-shaft to impart a direct drive to the latter, said pinion being adapted to be shifted into engagement with the aforesaid gear-wheel to impart minimum or intermediate speeds to the driven shaft, a laterally-shiftable reversing-gear adapted to engage said gear-wheel and to be engaged by the pinion, means automatically moving said reversing-gear out of engagement with the gear-wheel, separate mechanisms for imparting longitudinal and lateral movements to the said driving-shaft, and a single lever for actuating said shifting mechanisms as set forth.

18. In a power-transmission mechanism, the combination with a flexible power-shaft composed of pivotally-joined sections, and the driven shaft, of a transmission-shaft having its axis in line with the normal axis of the power-shaft and disposed remote therefrom, a bevel-gear secured to the rear end of the transmission-shaft and engaging a like gear on the driven shaft, a multiple-speed gear-wheel mounted on the forward end of the transmission-shaft, a longitudinally and laterally shiftable driving-shaft having a telescopic connection with the rear end section of the power-shaft and rotated thereby, a pinion secured to the rear end of the driving-shaft, means for temporarily interlocking the driving-shaft with the transmission-shaft to impart a direct drive to the driven shaft, means for shifting said driving-shaft longitudinally to engage and disengage the transmission-shaft, means for shifting the said shaft laterally to carry the pinion to and from the gear-wheel, a reversing-gear adapted to be engaged by said pinion and to be shifted thereby into engagement with said gear-wheel, and spring-actuated means retaining the reversing-gear normally out of engagement with the gear-wheel as set forth.

19. In a power-transmission mechanism, the combination with the power-shaft and the driven shaft, of a transmission-shaft provided with a multiple-speed gear-wheel, bevel-gears connecting said transmission-shaft and driven shaft, a longitudinally-shiftable driving-shaft adapted to directly engage the transmission-shaft and having a sliding connection with the power-shaft, a pinion secured to the driving-shaft and adapted to engage the multiple-speed gear-wheel, means automatically regulating the shifting movement of said driving-shaft, shifting mechanism, and a table lever for actuating said mechanism set forth.

20. In a power-transmission mechanism, the combination with the power-shaft and the driven shaft, of a transmission-shaft connected to the driven shaft, a shiftable driving-shaft having a suitable connection with the power-shaft and provided on its forward end with a rigid collar, a suitably-actuated lever connected to collar for shifting said shaft longitudinally whereby it is moved into and out of direct engagement with the transmission-shaft, a series of united gears of different diameters connected to the transmission-shaft, a pinion secured to the rear end of the driving-shaft, means for shifting the driving-shaft laterally whereby the said pinion is positioned in relation to any one of said gears to permit the same to move into mesh with said gear by action of the longitudinally-shifting mechanism, a bearing movable laterally with the driving-shaft, and means carried on said bearing for regulating the longitudinal movement of said shaft and operative for locking the shaft in its laterally-shifted position as set forth.

21. In a power-transmission mechanism, the combination with a flexible power-shaft and the driven shaft, of a suitably-supported casing provided with a transverse slot in its forward end, a transmission-shaft journaled in the rear end of said casing and connected to the driven shaft, a wheel secured to the transmission-shaft within the casing and formed in its front side with a cavity provided with a series of concentric internal gears of successively-increasing diameters, guides extending lengthwise of the slot, a journal-box supported movably in said guides, a driving-shaft extending through said slot and supported longitudinally shiftable in said journal-box and adapted to be shifted laterally thereby, means connecting the driving-shaft slidably with the power-shaft, said driving-shaft being adapted to directly engage and disengage the transmission-shaft when shifted axially in relation thereto, a pinion secured to the driving-shaft within the casing and adapted to be moved into and out of engagement with said internal gears by successive longitudinal and lateral movements of the driving-shaft, said driving-shaft being provided with a series of circumferential grooves at predetermined points, a dog carried on the aforesaid journal-box for automatically engaging and disengaging said grooves and serving to regulate the longitudinal movement of said driving-shaft, the aforesaid slot of the casing being provided with recesses adapted to be automatically engaged by said dog when the shaft is moved laterally to retain the pinion in engagement with the internal gear, and separate mechanism for shifting the driving-shaft longitudinally and laterally as set forth.

22. In a power-transmission mechanism, the combination with a flexible power-shaft composed of pivotally and slidably joined sections, and the driven shaft, of a transmission-shaft suitably connected to the driven shaft, a series of united internal gears arranged concentrically and having successively-increasing diameters, a driving-shaft provided at one end with a sleeve slidably engaging the rear end section of the power-shaft and provided at its opposite end with a pinion, said driving-shaft being adapted to be moved rearwardly to engage the transmission-shaft, and the pinion adapted to be moved into engagement with any one of the internal gears by successively shifting the driving-shaft forwardly, laterally and rearwardly, a lever shifting the shaft longitudinally, an arm shifting the same laterally, separate mechanisms actuating the lever and arm, a manually-operated lever for actuating said mechanisms independently, and means regulating said shifting movements as set forth.

CHARLES P. SMITH. [L. s.]

Witnesses:
J. J. LAASS,
L. H. FULMER.